No. 789,512.                                                           Patented May 9, 1905.

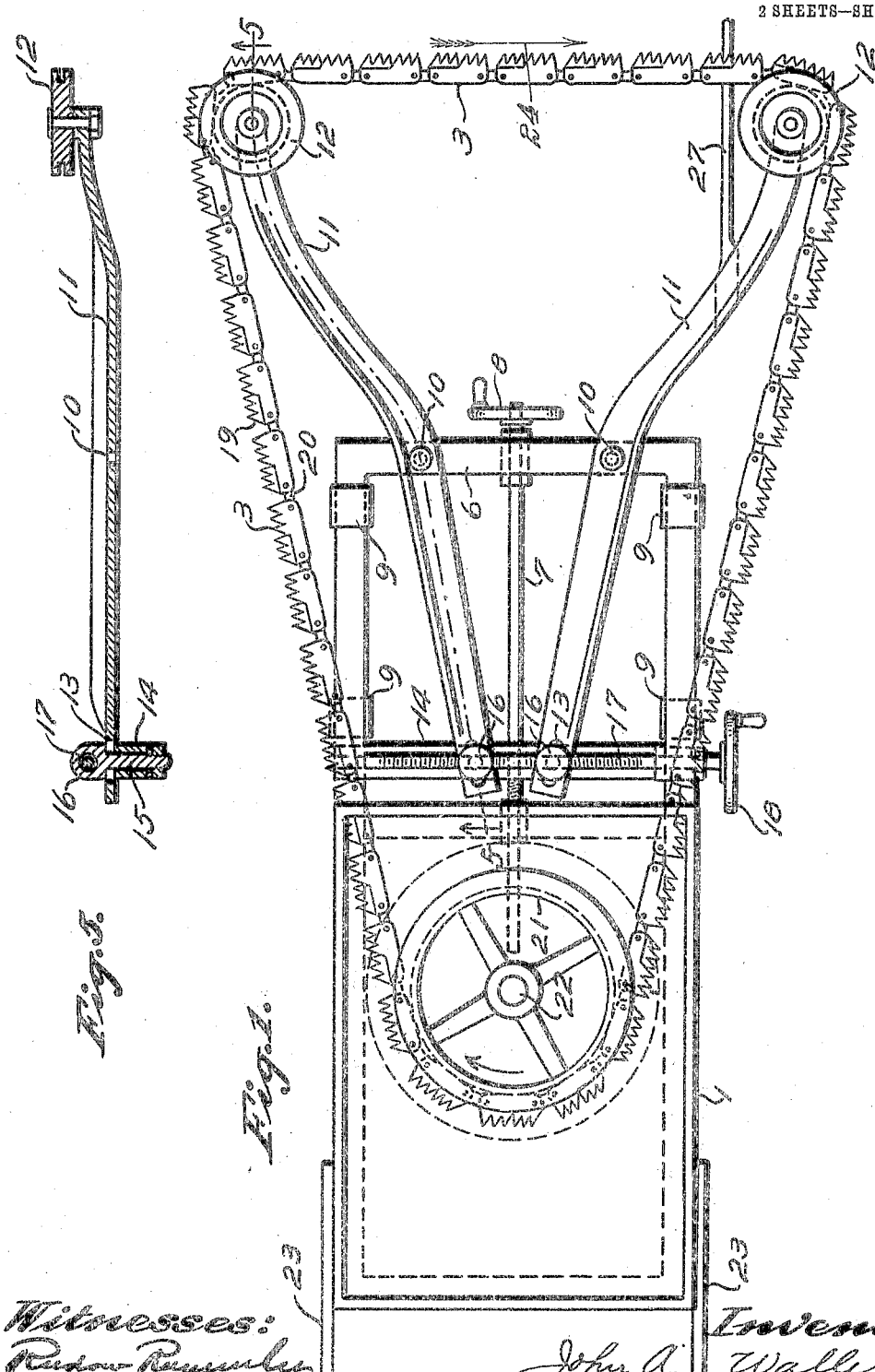

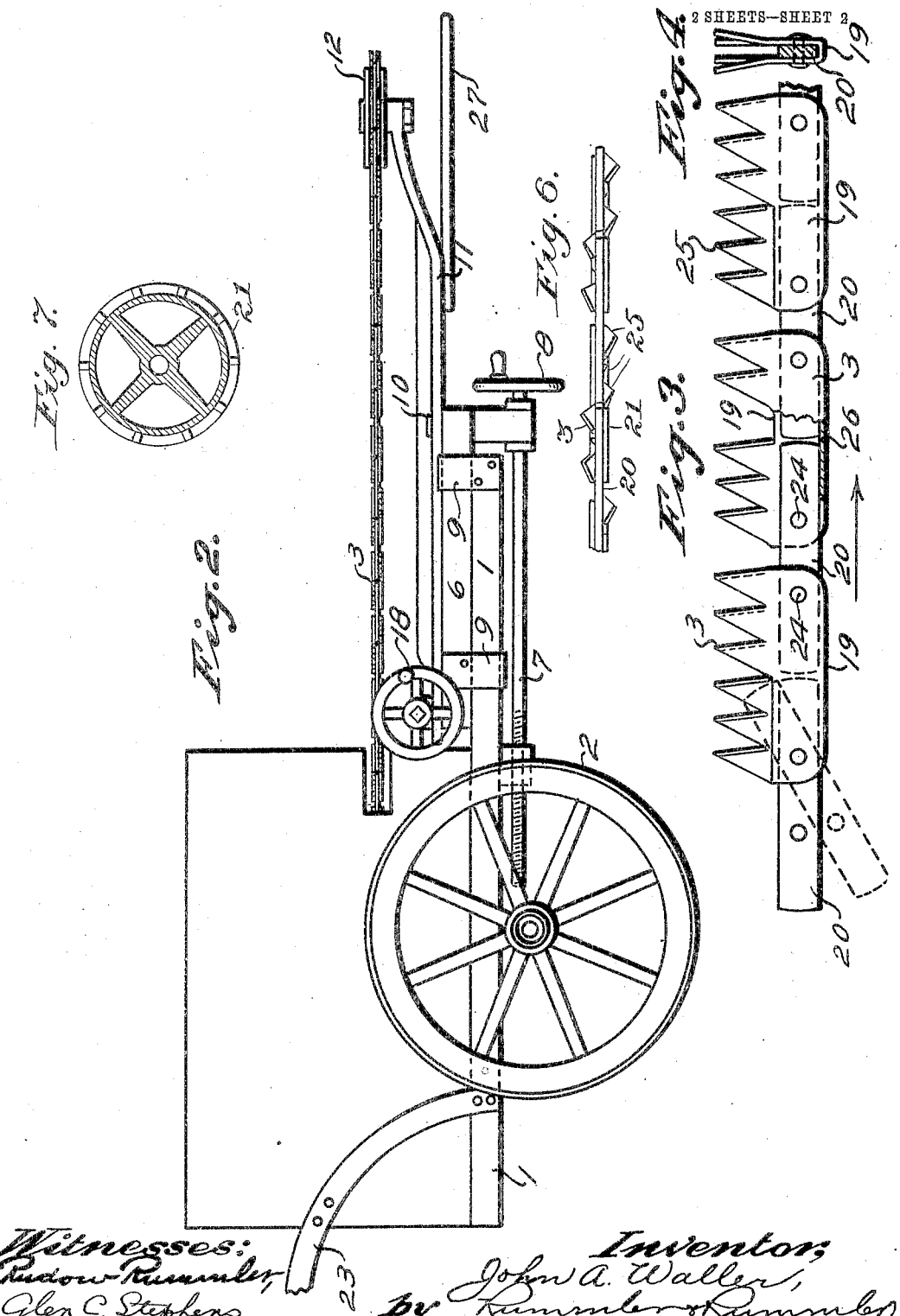

UNITED STATES PATENT OFFICE.

JOHN A. WALLER, OF CHICAGO, ILLINOIS, ASSIGNOR OF ONE-THIRD TO HENRY O. ANDERSON, OF CHICAGO, ILLINOIS.

CHAIN-SAW.

SPECIFICATION forming part of Letters Patent No. 789,512, dated May 9, 1905.

Application filed July 11, 1904. Serial No. 216,159.

*To all whom it may concern:*

Be it known that I, JOHN A. WALLER, a citizen of the United States of America, and a resident of Chicago, in the county of Cook and State of Illinois, have invented certain new and useful Improvements in Chain-Saws, of which the following is a specification.

The main object of my invention is to provide an improved form of flexible chain-saw particularly adapted for use in tree-felling machines and in places not accessible to a band-saw of the usual construction. I accomplish these objects by the device shown in the accompanying drawings, in which—

Figure 1 is a top plan of a tree-felling machine provided with a chain-saw constructed according to my invention, the motor for supplying power to the same being omitted. Fig. 2 is a side elevation of the same. Fig. 3 is an enlarged detail in plan, partly broken away, showing the construction of the chain-saw. Fig. 4 is a transverse section of the same. Fig. 5 is a section on the line 5 5 of Fig. 1. Fig. 6 is a view of the toothed face of the saw. Fig. 7 is a section of the sprocket-wheel 21, showing the sprockets thereon for engaging the links of the chain.

The device shown consists of a carriage comprising a rectangular frame 1, supported on wheels 2 and provided with a horizontally-disposed chain-saw 3, together with suitable motive power for driving the saw. The motor is preferably of a type that is easily portable, such as a gasolene-engine, and has been omitted from the drawings, since it is accessory to the main features of my invention.

Mounted on the forward end of the frame 1 is a horizontal sliding frame 6. The frame 6 is slidable on the frame 1 in a forward and backward direction, and its position is controlled by means of the threaded shaft 7, which is operated by means of a hand-wheel 8. The frames 1 and 6 are connected together by means of straps 9. One set of said straps is secured to the side bars of the frame 6 and extends around the corresponding side bars of the frame 1, while the other set of straps is secured to the frame 1 and extends around the side bars of the frame 6, thus permitting of the desired extensibility. Mounted on the frame 6 at 10 are two forwardly-extending arms 11, each carrying at its outer end a sheave 12, journaled on a vertical axis. The inner ends of the arms 11 are slotted at 13 and are connected to a cross-bar 14 by means of a bolt 15, having an enlarged head 16. A shaft 17 is journaled in suitable bearings on the frame 6 and extends through the heads 16 transversely of the arms 11. The shaft 17 has, respectively, right and left hand threaded engagement with the heads 16 and is adapted to move the sheaves 12 toward or away from each other through movement of the hand-wheel 18. The cross-bar 14 is slotted to permit of the desired movements of the bolts 15. The chain-saw 3 consists of a plurality of toothed sections 19, pivotally connected together by means of links 20, and is mounted on the flanged sheaves 12 and the flanged sprocket-wheel 21, which lie in the same horizontal plane. The sprocket-wheel 21 is rigidly mounted on a shaft 22, journaled in the frame 1 and driven by the motor, which is not shown. The sprockets on the wheel 21 are made in the form of radial ribs on the inner faces of the flanges and enter the spaces between the ends of the sections 19 of the saw.

In the device shown the carriage is controlled by means of rearwardly-extending handles 23, which are shown partly broken away in the drawings. The chain-saw consists of an endless link belt comprising a series of toothed sections 19, pivotally connected together by means of links 20. The links 20 preferably consist of straight bars, and the sections 19 are each preferably formed of a single piece of sheet metal bent upon itself to form parallel plates lying at each side of the links 20 and connected thereto by means of pivots 24, preferably located a considerable distance inward of the ends of the links 20. Each of the side plates of the section 19 is provided with a plurality of saw-teeth 25 on one edge of the same. The teeth on one plate extend along the front half of said plate, while the teeth on the other side plate of the same section extend along the rear half of the section. Thus the group of teeth on each plate is opposed to a space on the other plate, rendering it impossible for sawdust to become jammed between the two series of teeth. The teeth on each plate are also oppositely beveled, as shown in Fig. 3. Alternate teeth in each group are set outward, as shown in Fig. 4. In the form of link shown in the drawings each section is provided with a group of three teeth on each of its side plates, the middle tooth of each group being straight and the other teeth being bent outwardly. The outward disposition of some of the teeth causes the cut made made by the saw to be considerably wider than the thickness of the main part of the belt, and the straight teeth serve to tear out the material between the cuts of the teeth which are outwardly set. The pivots 24 are located a considerable distance inward of the ends of the links 20, and the back part 26, which connects the two side plates of the sections 19, serves as a stop for engaging the ends of the link 20 and preventing the saw from bending to a curvature which is concave on the toothed side of the saw. As the saw bends in the opposite direction through pivotal movement between the links, the ends of the links 20, which extend beyond the pivots 24, move outwardly along the teeth 25 of the cutting-sections and brush off any sawdust which may cling to the teeth.

The method of connecting adjacent links and sections which is herein shown may be applied to devices other than chain-saws. This feature is not broadly claimed herein, but is shown and claimed in my copending application for patent on chains, filed September 24, 1904, Serial No. 225,850.

One of the arms 11 is provided with an extension 27, which is adapted to engage the side of the tree and prevent the carriage from being forced away from the tree through the action of the saw, when the saw is driven in the direction indicated by the arrow 24 in Fig. 1.

The operation of the device shown is as follows: The side bars 11 are adjusted laterally to bring the sheaves 12 to a position corresponding to the width of the tree which it is desired to cut. This adjustment is effected by turning the hand-wheel 18. It is desirable that the sheaves 12 be as close together as practicable during the operation of sawing a tree. Any slackening or tightening of the saw due to the adjustment of the arms 11 may be compensated for by extending or contracting the frame of the carriage by turning the hand-wheel 8. It will be seen that the peculiar structure of the links of the saw permits the same to run freely on the sprocket-wheel and guiding-sheaves, but prevents backward yielding of the part of the saw which is between the sheaves 12 and engages the tree.

To fell a tree by means of the machine shown, the motor is started, causing the saw to be driven in a peripheral direction around the sprocket-wheel and guide-rollers. The carriage is then pushed forward against the tree, the falling of the tree being of course guided in the usual manner.

It will be seen that numerous details of the construction shown may be altered without departing from the spirit of my invention.

What I claim as my invention, and desire to secure by Letters Patent, is—

1. As an article of manufacture, a saw comprising a series of alternate links and sections, each of said sections comprising a pair of parallel plates spaced apart for receiving the ends of the adjacent links, each of said plates having teeth along one edge to form the cutting edge of the saw, said links and sections being pivotally connected together, and the links being extended beyond the pivotal axes to form parts adapted to sweep across the sections when the saw is bent as in passing around a sheave, substantially as described.

2. As an article of manufacture, a saw comprising a series of alternate links and sections, each of said sections comprising a pair of parallel plates spaced apart for receiving the ends of the adjacent links, each of said plates having teeth along one edge to form the cutting edge of the saw, said links and sections being pivotally connected together, and said links and sections being formed to permit bending of the saw convex to the cutting edge and prevent concave bending of the cutting edge, substantially as described.

3. As an article of manufacture, a saw comprising a series of alternate links and sections, each of said sections comprising a piece of metal bent upon itself to form a pair of parallel plates spaced apart for receiving the ends of the adjacent links, each of the plates having teeth along the edge opposite the bend to form the cutting edge of the saw, said links and sections being pivotally connected together on axes transverse to the cutting edge of the saw, and the links being extended beyond their pivotal axes to engage the sections and prevent the saw from being bent to a curvature which is concave on the cutting edge, substantially as described.

4. As an article of manufacture, a saw comprising a plurality of toothed sections each having a pair of parallel cutting edges on one side thereof and each of said edges having thereon a plurality of teeth, the teeth on each cutting edge being alternately straight and outwardly set, and links pivotally connecting said sections to form a flexible belt, substantially as described.

Signed at Chicago this 6th day of July, 1904.

JOHN A. WALLER.

Witnesses:
JOHN C. LIBE,
EUGENE A. RUMMLER.